UNITED STATES PATENT OFFICE.

HERBERT P. JEFFERSON, OF BOSTON, MASSACHUSETTS.

PROCESS FOR TREATING WOOL, HIRSUTE, AND OTHER ANIMAL FIBERS, AS WELL AS FABRICS OR TEXTILES AND THE PRODUCTS.

1,197,495.   Specification of Letters Patent.   Patented Sept. 5, 1916.

Application filed September 18, 1914.   Serial No. 862,321.

*To all whom it may concern:*

Be it known that I, HERBERT P. JEFFERSON, a citizen of the United States, residing at Boston, in the county of Suffolk and Commonwealth of Massachusetts, have invented a certain new and useful Process for Treating Wool, Hirsute, and other Animal Fibers, as Well as Fabrics or Textiles and the Products, of which the following is a specification, reference being had to the accompanying drawings.

My invention comprises a systematic process for treating raw wool, hirsute growths, and other animal fibers by means of certain prepared re-agents, predetermined, and successive, mechanical manipulations, and so that the material thus treated will be quickly, effectively and economically cleansed of all the objectionable impurities resulting from perspiration, sebaceous secretions and foreign earthy, vegetable, animal and mineral substances which may be enmeshed upon or in the said fibers.

It further consists in the recovery of the suint ingredients, that is to say the perspiration ingredients, which come from the sweat glands in the skin and are deposited on the fibers, or form a layer near their roots; and the recovery of the sebaceous matter that is fatty matter, which comes from the sebaceous glands and hair follicles in the skin and is also deposited on the fibers. The ingredients of urine and in the re-use of the water and fat solvents, as well as the avoidance of pollution of streams or bodies of water, and the avoidance of emulsification of the resulting lyes. As a further, and extremely valuable, result of the manipulation of my said process, I produce a wool not heretofore known, and a wool fat not hitherto recovered by any known commercial process.

In brief, the purpose of my present invention, is the economic and efficient cleansing of wool and other animal fibers; the easy, efficient and economical recovery of the more or less valuable by-products in a high state of purity; the diminution of loss in the weight of the greased wool; the retention of the essential wool oil, and, as already mentioned, the avoidance of pollution of streams, etc.

In carrying into effect my improved process, I have provided a systematic arrangement of mechanical devices, designed to be operated in proper sequence, and with facility whereby both the necessary chemical and mechanical actions and results may be attained, with the least possible handling, heat and cost.

Figure 1:
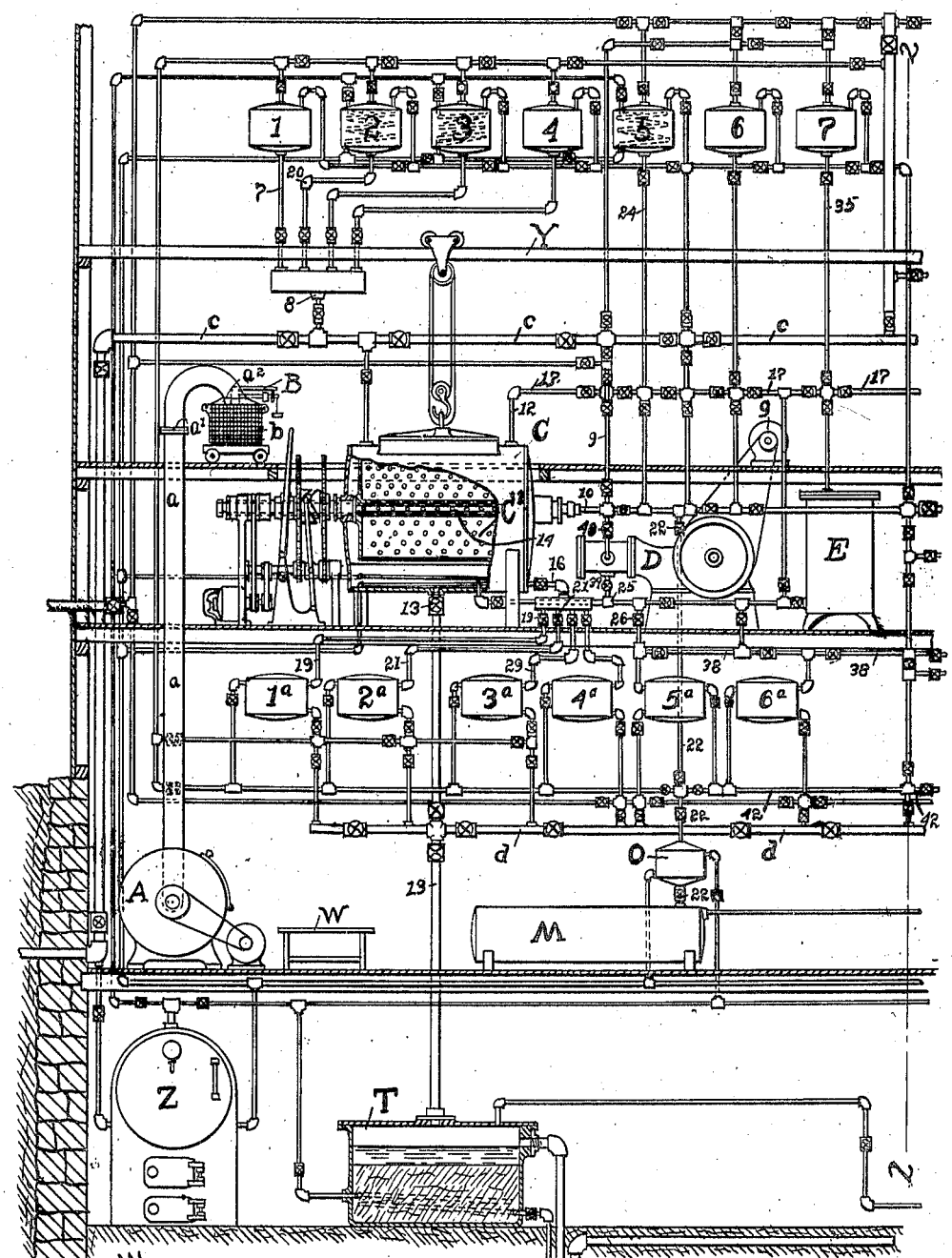
Figure 2:
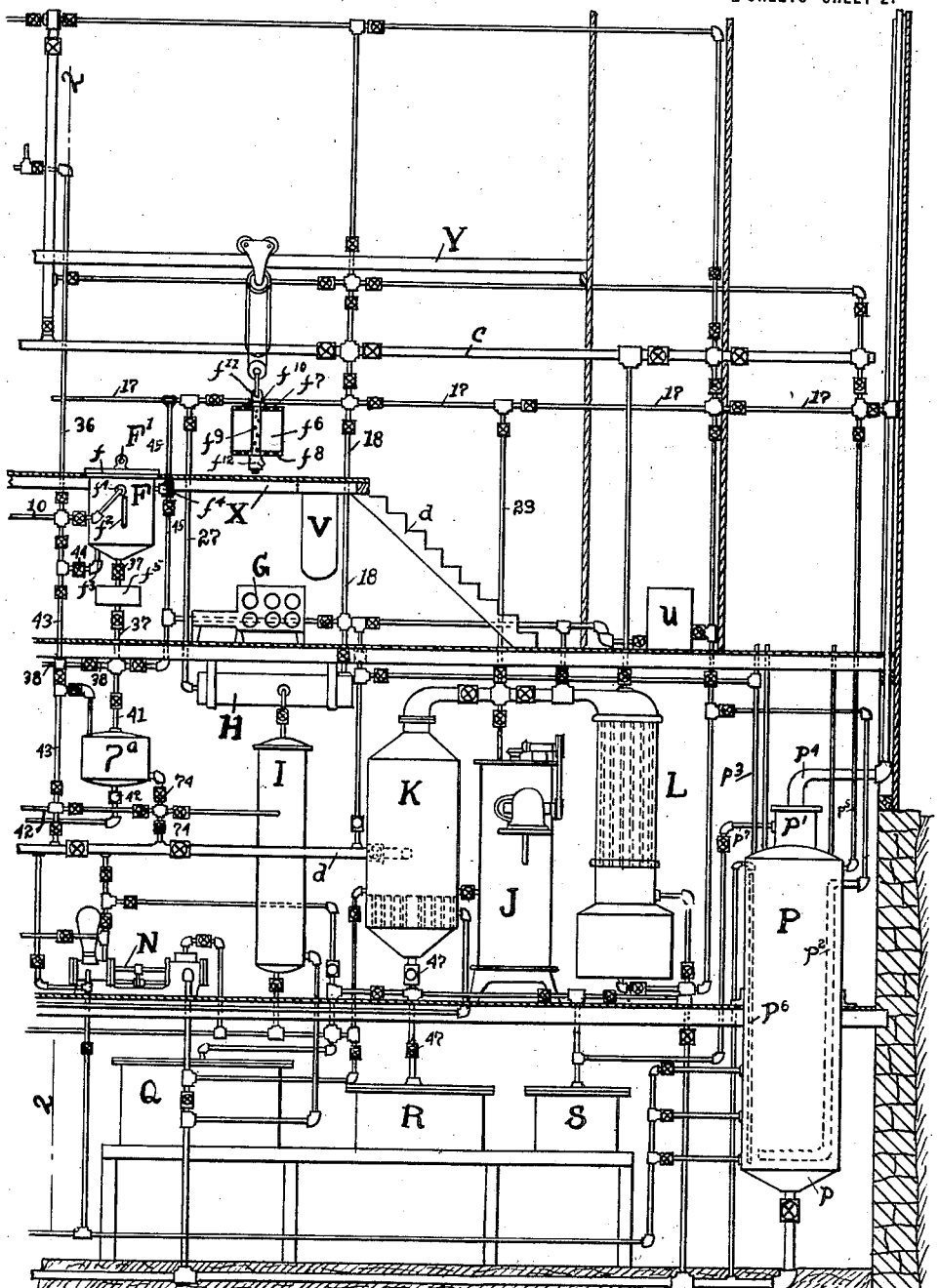

My said system, in so far as the mechanical devices are concerned, is fully illustrated in and by the annexed two sheets of drawings, one half portion of said system being shown in Figure 1 and the companion, or remaining portion, being shown in Fig. 2; the meeting portions of the detailed features of said system being indicated by line 2—2 in both of the said figures.

Perhaps the most important single member of this system, functionally considered, is the wool treating machine which is the subject of a separate application for patent, filed August 7th, 1914, Serial Number 855,699 and therefore referred to here only as the vacuo-centrifugal fiber and fabric treating machine C.

W represents a wool-sorting table for the selection of the grade of wool to be cleansed and otherwise treated.

A is a representation of a suitable separator, duster and blower, such as a cone duster; $a$ represents a pneumatic tube having a swivel connection $a^1$.

$a^2$ is a funnel-shaped termination of tube $a$ for an outlet into a basket $b$ resting on a platform scale B.

C represents the vacuo-centrifugal washing machine already referred to; D is a dry vacuum pump; and E is an expansion tank.

Referring now to Fig. 2 of the drawing; F indicates a disintegrator or filter which may be used for treating small samples of wool in practically the same manner as is done in the machine C. Briefly described, the said disintegrator F is a cylindrico-funnel-shaped vessel with a tight-fitting removable cover $f$ which has a lewis $F^1$ for the purpose of lifting it open, a sight-gage or glass $f^2$ for observation purposes, and an inlet at the bottom $f^3$ and an outlet $f^4$ near the top of said vessel; the inlet at the bottom is for the purpose of introducing hot air and it includes an inward-acting valve, not shown; $f^5$ is a glass receptacle for observation and for the removal of heavy material and the receptacle $7^a$ is for the final disposition of the used humors.

The vessel F has within it, and closely fitting it in circumference, a basket $f^6$ which may hold wool or other material, used for filtering, or wool or other fiber to be cleansed, as the case may be. This basket $f^6$ has a disk-shaped, perforated, top and bottom $f^7$ and $f^8$ and also a central, hollow, perforated tube $f^9$ which is extended upward through the top and downward through the bottom; at the top is a nut $f^{10}$ and a ring or lewis $f^{11}$ by means of which the basket may be lifted out of the vessel F. At the bottom end of said tube, is an inward-acting valve $f^{12}$. The capacity of the basket $f^6$ is, preferably, about thirty-two cubic feet, to hold about one bale of wool.

G indicates a crush-roll machine for crushing lumps of paint or hardened fæces, or earthy matters, as frequently found on tag-locked wool; H denotes a gas tank; I is a gas heater for preheating re-agents; J is a vapor absorber or air separator for separating air from vapors; K is a vacuum still and L is a condenser.

Referring now to Fig. 1 of the drawing, M indicates a suitable compressed air tank and O is a receptacle, provided with a thermometer, for preheating the compressed air, as it is in this receptacle that the air is heated by a steam coil when warm compressed air is required for drying, or driving, or other purposes in my system.

Referring again to Fig. 2, N denotes a circulating pump for forcing water or other liquids and for circulating the same when required; P is a settling-separating machine specially constructed for the purpose of recovering the several ingredients from the lyes and other solutions in my process. This machine consists of a vessel which is cylindrical in shape with a funnel-shaped bottom $p$ for the collection of heavy precipitates, and a bottle-necked shaped top $P^1$ for the collection of lighter oil or grease; also various inlets and outlets so arranged that liquids of various specific gravity, or Baumé strength, may be floated or drawn off; an inlet pipe $p^2$ extends from the outside inward and down inside of the machine nearly to the bottom and terminating in a perforated lateral end for the purposes of introducing steam, hot air, chemicals, fat solvents and other substances as may be required: an outlet pipe $p^6$ being provided near the bottom of the said machine P and extending upward to near the top of the said machine for discharging liquids heavier than water. By preference, I also provide a plurality of outlets arranged at different heights on the side and top of the machine for discharging liquids lighter than water, as well as gaseous substances; $p^4$ is a vent pipe leading from the top of the machine to a ventilator; $p^5$ is an inlet pipe for water; $p^3$ is an inlet pipe for introducing solutions to be treated at the top of the machine; and $p^7$ is an outlet pipe located near the bottom of the neck-shaped portion of the machine for drawing off oil or greasy liquid material. U indicates a mixing vessel supplied with heating coils, and used for mixing and making certain solutions used in connection with my improved system. In Fig. 2 is a baling stand V for baling and bagging wool, etc. X is a raised platform or mezzanine floor, arranged at a proper height from the main floor for an operator to work while weighing and bagging wool and while introducing material into, and removing it from, the machines C and F. Y indicates an iron track having a traveler thereon for moving the basket $f^6$ from place to place and also to aid in opening the doors of the machines C and F by suitable means, as with fall and tackle; Z is a steam boiler. The vessels 1, 2, 3, 4, 5, 6 and 7 are supply tanks; and $1^a$, $2^a$, $3^a$, $4^a$, $5^a$, $6^a$ and $7^a$ are receptacles for receiving the solutions or lyes. T is a fertilizer or mud tank; Q is a potash receptacle for the distillate from the vacuum still K. R is a grease receptacle, and S is an oil receptacle; $d$ indicates stairs leading to the platform X. In Fig. 1, $g$ denotes an electric motor for power purposes. The system includes suitable shafting, pulleys, etc., for driving and power purposes and there may also be arranged valve controllers for the quick and convenient operating of the various valves. By means of mains, heads and pipes, the various solutions, solvents, compressed air, gases, vapors, water, etc., are transmitted from and to the various machines and vessels and are referred to in the technique of the operation of my system My system of cleansing wool, and other fibers, is neither that known as the alkaline or emulsion system, in which soaps or alkalis are used for scouring purposes, nor that known as the solvent system, in which fat solvents are at first used followed by soaps or alkalis as scouring agents, which two systems have heretofore been recognized as the principal systems, the former the more general of the two; but my present system is a far more economical and efficient system, being one which removes only the impurities found on wool which it is necessary or desirable to remove, in order that the highest efficiency may be produced for useful purposes, and which leaves the essential oil of wool in the fiber to make of it a new and valuable product for manufacturing purposes and, at the same time, separates and recovers the solutions in a non-emulsified condition so that, by a comparatively easy, economical, and efficient treatment, the various by-products may be obtained in a pure and valuable state, and the water and other solvents recovered by distillation for re-use.

By my invention, the wool fiber is subjected first to a process whereby the substances, which readily emulsify and are insoluble in any ordinarily used solvents, are made to undergo a sort of disintegration or transformation so that, when the subsequent processes are employed, they will be dissolved out of the fibers and there will be no emulsifying re-action in the resulting lyes.

Among the impurities found in wool and other animal fibers there commonly exists certain substances, such, for example, as lime soap, which are insoluble in water or in weak alkaline solutions or in fat solvents or in other agents commonly used in cleansing wool, but they are readily emulsifiable. These compounds are decomposed or broken up and transformed by employing, in the manner described hereinafter, certain acid gases, more especially preheated carbonic acid gas, as this cannot injure the fibers nor the fatty material, as, for instance, in case of the insoluble lime soap, the fatty acid is separated from the lime and, in place of the said lime soap, there are produced substances, removable by, and soluble in the subsequently used agents.

The following is explanatory of my preferred method of operating my natural system of cleansing or treating wool, which forms the basis of the invention for which I desire to obtain a patent. Although this process may be carried out in any suitable apparatus or system I prefer machines and apparatus of a nature as herein described and illustrated in Figs. 1 and 2, because of their comparative inexpensive construction, and also because this system admits of; a continuity of simple action; absolute safety as regards the use of fat solvents; the avoidance of loss of volatile solvents; the re-use of water; the re-use of solvents other than water; the avoidance of loss of wool or other fibers; the prevention of any felting or other destruction of fibers; the controlling of the removal of the various extraneous substances, so, that the natural essential oil of wool may be left in the fiber to give it some of its chief characteristic qualities, such as softness, suppleness, strength and elasticity. By essential oil of wool, I mean the oil which is deposited in the cortical cells of the fiber while the fiber is in the hair follicle; there is a distinctive difference between this oil and the fats and higher fatty acids obtained from raw wool and which are deposited on and under the scales of the fiber. My method removes the latter without injuring or removing the former; the said oil in the cells of the fiber is an absolutely necessary constructive part of the wool fiber and I have given it the name essential oil on this account. This "essential oil" is the sole life-giving substance of the keratin in the raw state, and is then associated with the fiber-growing fat. In my new product the fiber-growing fat is not needed. It is removed in the new fiber from the now sole life-giving substance, which I term "essential oil", which essential oil gives to the purified keratin its life, nature and quality, and develops in the keratin, elasticity, tensile strength, color, waviness, etc., which are essential to the wool for manufacturing purposes. Thus my new product is composed of keratin, uninjured, and the said life-giving substance; the sebaceous and other fats, as well as the suint and other ingredients which are of a deleterious nature being wholly removed. I know of no other method of commercially cleansing wool in an efficient or economical way than by my method, which leaves this oil in the cells in a free clean state without leaving any of the wool fat or higher fatty acids on or under the scales of the fiber at the same time; and this is a most important factor in the first real process of manufacture, namely, the cleansing or scouring of raw wool; I may state further that this essential oil is not a fat, in that it is not "an ethereal salt of glycerin," neither is it a saponifiable fatty acid, but it is an oil distinctively peculiar to wool and analogous fibers and always present in the healthy fiber in its middle portion, while the fiber is in, and extends from, the follicle. I may also state in this connection, that the wool fat and other fatty substances on or under the outer or scaly portion of the fiber should be removed. It is easy to leave some of such elements on or under the scales of the fiber, but it is unnecessary, (and, on the whole, deleterious to subsequent processes of manufacturing wool into the best materials or fabrics), especially, if the essential oil is left in the cells of the fiber. The efficient and continuous process employed by me removes the suint and sebaceous ingredients and leaves the constructive fiber and oil uninjured in their nature, and unimpaired. The removal of tar, paint or pitch; the removal of burs without excessive heat, carbonizing or acid salts; the non-agglutination of the scales of the fibers, and consequent avoidance of changing the shape of the fiber in its longitudinal or transverse dimensions; the avoidance of pollution of bodies of water; the recovery of the suint fats and fatty acids; the recovery of the sebaceous fat; and the excellency of the condition of the wool recovered.

Describing now my preferred operation of my said system:—first, a selected sort or grade of wool to be treated is placed in the separator-duster machine A and, when the wool has been sufficiently opened up, and a quantity of earthy matter or dirt is shaken out of it, if required, the wool is blown through the tube $a$, or otherwise conveyed, into the wire basket $b$ and weighed; the operator then moves the basket in close proximity to the opening of the vacuo-centrifugal machine C and proceeds to fill the various apartments of its inclosed perforated cage to their utmost capacity, packing the same more or less closely according to the quality and condition of the wool; he then closes the opening of the machine so that the wool is confined in an air-tight casing, and sets the revolving cage to slow reverse revolutions of, preferably, three to five or more revolutions per minute, and, by operating the proper valves in the various pipes, he starts the dry vacuum pump D and proceeds to cause a vacuum in the machine C to the desired degree as indicated on a vacuum gage, not shown; having accomplished this he stops the pump, closes the valves, and proceeds with the first step of the cleansing process, by admitting from the gas tank H pre-heated carbon dioxid, preferably, though other acid gases may be used by me as acetic acid gas, hydrochloric acid gas or any acid gas having substantially analogous properties, the object for their use being to transform or decompose and change the insoluble substances into substances removable by the subsequently used agents, to make soluble those substances found on raw wool which are emulsifiable and insoluble, without such change in any ordinarily used solvents, such as water, alkaline or soapy solutions, or fat solvents, through the central perforated axle of the machine C and this gas disperses itself from the center of the wool mass in all directions outward to the periphery of the wool and fills the chambers of the machine. The cage $C^1$ continues to tilt in this gaseous atmosphere for a few moments and is stopped, and the said gas is permitted to escape through the outlet vapor pipe 12 via pipes 17 and 18 and is forced back into gas tank H for re-use. The temperature of the said gas while in the machine C must not exceed one hundred degrees F., in atmosphere, correspondingly less *in vacuo*. The operator next proceeds with the second step by again setting the cage $C^1$ to slow reverse revolutions as before; and admits, from supply tank 1, cold distilled water, via pipes 7, 8, main c, pipes 9 and 10 to the center of the mass of wool via the hollow perforated shaft 14 where it disperses itself in all directions outward toward the periphery of wool, until the outer casing of the machine C is filled to a suitable height upon the revolving cage $C^1$ to, say about, three or four inches more or less, and the revolutions are continued in and out of the water for a few moments and the resultant mud and solution is drawn off; the machine is set to rapid continuous revolutions to extract by contrifugation as much as possible of the moisture from the wool mass and the revolutions stopped and the resultant lye is again withdrawn via pipes 16 and 19 to receptacle $1^a$ and the resultant mud is removed to tank T, then the operator proceeds with the third step as follows:— by again setting the cage $C^1$ at slow revolutions as before and causing a vacuum in machine C and admitting a warm solution of distilled water containing not over one per cent. 26° aqua ammonia or a warm solution of the previous solution recovered as a result of the second step, that is to say a solution of the perspiration ingredients dissolved out of wool by my use of cold distilled water and when of not less than 10° Baumé from supply tank 2 via pipes 20, 8, main c, pipes 9 and 10 to the center of the wool mass which solution passes in all directions outward toward the periphery of the wool until the machine is filled as before, the temperature of this liquor, as shown by the thermometer on machine C, should indicate, not over, what would equal 105° F., in atmosphere, correspondingly less *in vacuo*. The wool is permitted to revolve in and out of this solution for a few moments when all the remainder of the perspiration or suint ingredients and the heavy earthy foreign substance, not previously removed by the cold distilled water is now removed. The operator then withdraws the resultant lye via pipes 16 and 21 to receptacle $2^a$, having previously removed the heavy muddy precipitate collected in the settling tank in the bottom of the machine C via pipe 13, to the fertilizer tank T. He then proceeds by changing the driving force of the machine C, from slow reverse action of the cage $C^1$ to rapid continuous revolutions, to extract from the wool mass as much as possible of the adherent solution and moisture; again changing to slow reverse action, he, preferably, admits pre-heated compressed air from tank M, via pipes 22 and 10 and hollow shaft 14 of the machine C to the center of the mass of wool where it is dispersed in all directions outwardly to the periphery, and opening the vapor pipes 12, 17 and 23, permitting the escape of vapors thereby formed to the condenser L; thus removing the remainder of the moisture in the wool, and is now ready to begin the fourth step thusly; by closing the machine outlets, he starts a slow reversible revolution of the wool, creates a vacuum as before and admits from supply tank 5, via pipes 24 and 10, and shaft 14, to the central portion of the wool mass, a cold or pre-heated fat solvent of a non-inflamnable nature, preferably, trichorethylene, carbon tetrachlorid or a combination of either of them with some of the other fat solvents, in such a way that the non-inflammable nature of the solvent is not destroyed, according to the requirements of the character of the wool under treatment, when it is slowly dispersed outward through the wool mass in all directions until a sufficient quantity is collected in the machine, as indicated by the sight-gage to cover the wool to two or three inches of its height, and the slow revolution of the wool mass in and out of the solvent is permitted for a few minutes, thereby removing all of the sebaceous and adipose tissue fat. He then withdraws this solution of pure wool fat via pipes 16, 25 and 26 to receptacle 5ª, and withdraws any precipitate collected, via pipe 13 and main $d$ to still K. He then closes the machine C and sets up the rapid revolution of the wool in the previously caused vacuum, to extract by centrifugation, the solution adhering to the wool, and withdraws the same again to receptacle 5ª, then again creating a vacuum, and changing to slower revolutions he admits the preheated carbon dioxid gas at a temperature not to exceed 120° F. via pipes, 27, 17, 9, and 10 to the center of the wool mass and by dispersing the warm gas in all directions outward toward the periphery the solution remaining is vaporized and forced out of the wool and the vapors removed through the vapor pipe 12, pipes 17 and 23 to the condenser L, when the solution is thus removed from the wool fiber. The operator then proceeds to give the wool its final wash or the fifth step of the process. This is accomplished, either with warm distilled water or with a detergent agent in the distilled water. If only distilled water is required, the same is forced through the center of the wool mass as before, and the machine allowed to fill as before, then setting up slow reversible revolutions of the cage $C^1$ filled with wool for a few minutes, the wool is thus cleansed, the wash liquor is then drawn off into receptacle 3ª, via pipes 16 and 29. The operator then admits pure distilled water, for the purpose of rinsing the wool, and this is drawn off into receptacle 1ª or 3ª, according to what has been used for the final wash. A vacuum is then created in machine C; having done this the operator sets the drum $C^1$ to slow reversible revolutions and admits to the center of the wool, compressed air pre-heated to a temperature not to exceed 120° F., correspondingly less *in vacuo*, from the compressed air tank M as before and the said pre-heated air disperses itself *in vacuo* from the center of the wool outward in all directions toward the periphery and the vapor is allowed to escape, thus driving off all moisture and drying the wool from the core to the periphery. The operator now opens the machine and removes the thus treated wool contents in a perfectly clean condition, containing within its fibers the essential oil of wool and, placing the said wool in the basket $b$, he weighs the same, and it is then put into bale V, thus completing the process.

As some wool contains paint, which has been used for the purpose of marking the sheep, we will now proceed to describe the process for removing the same. The painted wool is placed in the drum $C^1$ of machine C and treated in the same manner as before up to, and including, the fourth process, with the exception that, after extracting the fat solvent by centrifugation, the vapors are allowed to escape through pipes 12, 17 and 23 to the condenser L and the solution drawn off from the machine. The operator then removes the wool thus treated to the machine F in the following manner. Having lifted the cover $f$ of machine F, he removes the basket $f^6$ and moving it along track Y in apposition with machine C, he fills the same two-thirds full of wool from the machine C, and moves the basket $f^6$ and its contents along said track to lower the same in apposition with the crush-roll machine G to crush any hard lumps of paint, by passing the wool through the rolls and pickers and then replaces the thus treated wool in basket $f^6$; replacing the cover $f$, and lowers the basket $f^6$ into machine F, closing said machine with its cover $f$, thus sealing the machine air-tight. He then opens supply tank 7, and admits a paint disintegrating solution via pipes 35, 17, 36 via pipe 10 to machine F until he has introduced a sufficient quantity of the paint disintegrating solution to cover the wool. He then closes the supply pipes and permits the wool to soak in this solution for a period of time varying from fifteen minutes to one half hour, more or less according to the condition of the paint. He then opens the various valves in pipes 37, 38, 26, 25, 39, 40 and 10 and starts the pump D, and thus circulates the solution from machine F to the top of F again and into the wool and through the same and permits this to be done for a few moments, when he stops the pump, closes the various valves, except those in 37 and 41, and permits the solution to be drawn off into receptacle 7ª. Closing the valves, the operator forces sufficient warm air from tank M via 22, 42, 43 and 44 into machine F to drive off the remaining moisture, as vapors, through pipes 45, 17 and 23 to condenser L. He then removes the thus treated wool by lifting out the basket $f^6$ from machine F, when it is again transmitted along track Y and replaced in machine C, where it undergoes a final washing and drying, as with the better grade; when the wool will be freed of the said paint and be in perfect condition. When burry wool is to be treated in the raw state, it is introduced as before in machine C and treated, as with the better grade, up to and including the fourth process and then it is removed from machine C in a moistened state to a suitable bur picking machine G wherein all the burs are picked out of the wool in a moist state, after which the wool is replaced in machine C for final washing, rinsing and drying as before, and removed in a clean state. Certain pulled wools contain a considerable amount of lime or depilatory. When this sort of wool is to be treated in the raw state, the process is as follows: wool is placed in the basket of machine F, as before, and dilute hydrochloric acid is introduced into machine F, sufficient to cover the wool and, after a few minutes treatment, by forcing the acid through the wool, and re-circulating it through the wool, the acid solution being then removed through the discharge pipe to receiving vessel 7$^a$, when a weak alkaline solution as, for example, perborate of soda is placed in the machine sufficient to neutralize the acidulated wool and this is drawn off; the wool is then removed from machine F and transferred to machine C where it is treated in the same manner as the better class of wool.

In connection with the foregoing explanation of the various processes it should be said that the lyes and solutions, which have been received into the various receptacles, are re-used, each of its kind in the cleansing processes, until they have become of sufficient Baumé strength to make it practical to submit them to the distillation process in still K, or about 12° Baumé.

The following is descriptive of the means employed in recovering the various solvents for re-use in a purified state, and the recovery of the various by-products obtained from the wool, as potash, wool fats, fatty acids etc. The lyes from receptacle 1$^a$, 2$^a$, 3$^a$ and 4$^a$, or either of them, are drawn off through their respective pipes to main $d$ via pipes 43 and 10 into the filter F, into whose basket F$^6$ some wool has been placed and the lyes are therein filtered, through the wool in and out by circulation, as in the paint process, until the solution appears in a clear state freed from earthy materials as shown in the glass receptacle $f^5$; when it is drawn off into receptacle 7$^a$ and from thence through pipe 74, main $d$ into still K, where the water is distilled off as vapor into condenser L, and forced back as distilled water into supply tank 4. The residue is drawn off from the vacuum still K into receptacle Q for further treatment for the recovery of the suintine ingredients.

Proceeding now for the recovery of the elements in receptacles 5$^a$ and 6$^a$;—the solutions therein contained are drawn off through their respective pipes to main $d$ to vacuum still K and the solvents are distilled off as vapors into condenser L from whence they are transmitted to supply tank 6 as purified solvents. The residue is drawn off from the still K into receptacle R via 47 as true wool fat. The contents of receptacle Q, being of a complex nature, are removed to separator P where they are treated for the separation of the potash from the fat and fatty acids, which treatment may become the subject for another invention. Suffice it to say that the potash is recovered eventually as a yellow prussiate of potassium and the fatty acids, as oleic acid, stearic acid and other fatty acids and numerous other ingredients may be recovered when desired. The deposit in receptacle R is a new and valuable product, to wit, a high grade of wool fat, not heretofore recovered as an ingredient from wool.

In Figs. 1 and 2, there are displayed numerous pipes and valves, also a steam boiler Z, a vapor absorber J, and a fertilizer or mud tank T which is a closed vessel having steam pipes within it, and various outlets and inlets and is for the purpose of receiving the heavy earthy materials from the machine C and the separator P and for the further purpose of treating the same so that they may be converted to a dry state, and become of some use as a fertilizer. The mixing tank U is a closed vessel, supplied with a tight cover and outlets and inlets and used for the purpose of mixing the various solutions when required; it also has a steam jacket or coil. The pre-heater I is used for heating purposes. The vapor absorber J, is used for the purpose of separating the various gases from the various vapors or volatile substances. The receptacle S, receives the lighter oils or fats from the separator P; the table W represents a wool sorter's table for sorting wool. Although not shown in the drawings, the several valves are fitted with various means, so that they can be manipulated in convenient places by the operator. The still K, being a vacuum still, and constructed in a special manner, a much lower degree of temperature is required to operate it than is commonly used, and it is supplied with a cold chamber so that the fats undergo a lower temperature hence are in better condition than by other devices used for distillation purposes so far as I am aware. Although I have adopted the described method, of assembling the various elements of my apparatus, they may be assembled in other ways. Furthermore, three or four of my vacuum-centrifugal-fiber and fabric-treating machines may be properly assembled and used in conjunction with the other apparatus herein described without addition to said apparatus, excepting the necessary piping, as the system (as to apparatus as represented) is of sufficient efficiency to take care of the various machines and chemical means employed.

My described process provides for the least possible heat, handling, and agitation of the wool fibers and prevents discoloration and felting; it is a continuous simple operation; absolutely non-injurious to either materal or person as regards solvents used as re-agents; it renders possible the recovery in a pure state of the potash, the wool fat and the solvents employed as well as the recovery and re-use of all water used and thus avoids the pollution of streams and bodies of water; the removal of paint, tar, pitch, burs or other extraneous injurious substances and the retention of the natural essential oil of wool in the fibers, thereby invariably producing a new and valuable article for manufacturing and other purposes, which possesses the following characteristics: each wool fiber retains its natural construction, color, luster, elasticity, tensile strength, scaliness, length and thickness; its essential oil in a clean natural state which renders the wool soft to the touch, supple, less easily injured in handling, less hygroscopic, easier to card and to comb; it does not require the introduction of foreign oils; it yields finer and better threads, better and stronger yarns; there is less loss in subsequent preparations for manufacturing; it will shrink less after being manufactured into a textile state and produce a better quality of cloth; it will dye more readily and has better spinning qualities than any so called wools heretofore produced and is, in consequence of all these qualities, a new and valuable quality of wool. Furthermore, and simultaneously, therewith, my described process invariably yields a new and valuable article of commerce, not heretofore produced by any commercial method of treating raw or greased wool inasmuch as the pure fat elements are recoverable without any change of the fat molecules or globules from those existing in the sebaceous glands or adipose tissue of the sheep and freed from extraneous substance with which they become incorporated when deposited on the wool fiber in its raw state; the fat is further-more separated from the wool oil; the higher and lower fatty acids and other extraneous substances, inherent in, or adherent to, said wool thereby producing a new and valuable pure wool fat for uses as an edible, salve or unguent or other valuable purposes in commerce.

Having thus described my invention, the apparatus and the manner of its operation, I claim as new and wish to secure by Letters Patent:—

1. The method, as substantially described, of treating wool which consists in subjecting it, in the raw state, first to vacuum; second to treatment with carbon dioxide to make soluble the substances which are readily emulsifiable and insoluble without such change; third treating it with cold water; fourth treating it with a preheated weak alkaline solution; fifth, treating it with a solvent of sebaceous and adipose tissue fats; sixth, with preheated carbonic acid gas; seventh, with preheated distilled water; eighth, with cold water; then drying the said wool, first by centrifuge and then with preheated air.

2. The method of treating raw or grease wool which consists of a continuous process, in an air-tight vessel under diminished pressures, by subjecting it first to preheated carbon dioxid; second to cold distilled water; third to a preheated weak alkaline solution; then extracting all moisture from the wool mass and continuing by subjecting it to a fat solvent; then removing all moisture from the wool and washing it with preheated water; rinsing with cold water then extracting all moisture by centrifuge first, followed by subjecting it to preheated air, substantially as described.

3. The method of treating raw wool which consists of a continuous process, under diminished pressures, by first subjecting it to an acid gas to decompose and render soluble the substances which are emulsifiable; second, subjecting it to cold distilled water to remove the substances soluble in, and removable by cold water; third to a preheated weak alkaline solution then extracting the solution and all moisture from the vessel and the wool mass first by drawing off from the vessel the solution then by centrifugation of the wool mass and by introducing a preheated media as compressed air; fourth to preheated volatile fat solvent to remove the sebaceous and adipose tissue fats; fifth to preheated carbonic acid gas; sixth to preheated distilled water; seventh to cold water, then drying the mass first by centrifuge, then by preheated compressed air, substantially as described.

4. The method of preparing wool which consists in subjecting it, in its raw state, first to vacuum; second to carbon dioxid; third to pure cold water; fourth to a preheated weak alkaline solution; fifth to a volatile fat solvent; sixth to carbonic acid gas; then washing and rinsing the mass of fibers; thereby removing first earthy matter, then suint and sebaceous inherent ingredients and leaving in the cells of the wool fiber the oil which is one of the constructive elements of wool thereby producing an improved quality of wool.

5. The method of treating wool which consists in subjecting it, in its raw or grease state, to preheated carbon dioxid; then treating it with water; then with a preheated solution comprising the solution of suint ingredients obtained from raw wool; then with a solvent of subaceous and adipose fats embodying tri-chlorethylene, and, finally, washing, rinsing and drying it, preceding each of the foregoing steps by subjecting the wool to diminished pressure, thereby leaving in the wool the essential oil which constitutes one of the substances naturally inherent in wool.

6. The method of treating wool, which consists of subjecting it, in the raw state, to a suitable acid gas, to render soluble and prevent the subsequent emulsification of the insoluble and emulsifiable substances; then treating the wool with water, removing thereby all substances soluble in, and removable by, cold water, then treating the wool with an alkaline solution, thereby removing suint ingredients and earthy matters; then treating the wool with a non-inflammable fat solvent, thereby removing, by solution, the subaceous and adipose tissue fats, leaving as an essential part of the wool, the essential oil, and, washing, rinsing and drying the wool, and completely removing each solvent or re-agent from the wool before administering the next solvent or re-agent in the series.

7. The method of treating raw wool by subjecting it to a continuous process under diminished pressures and introducing all of the following elements to the center of the mass of wool and dispersing them outward in all directions and out at the periphery of the mass into the treating vessel in continuous succession, in the order described— beginning with a preheated acid gas, to render soluble the emulsifiable and insoluble substances to prevent subsequent emulsifications; then treating the fibers with cold water; then with preheated weak alkaline solution as described; then with fat solvent; then with carbon dioxid; then with warm distilled water; then with cold water; then with warm air; and by these means removing the deleterious substances from said wool leaving the essential oil in the fibers in a clean state substantially as described.

8. The herein described method of treating raw or greased wool by simple continuous chemico-physical process, by introducing pre-heated acid gas, under-diminished pressures, to the center of the wool mass, and dispersing it outward toward, and out at, the periphery of said mass; then removing said gas; and consecutively continuously introducing, under diminished pressure, first, pure cold water; second a warm weak alkaline solution; third, a fat solvent; fourth, warm carbonic acid gas; fifth, warm water; sixth, cold water; seventh, warm air to the center of the said mass of wool, and dispersing each outward, toward and out at the periphery of the said mass, to bring each of them in intimate contact with all of the fibers of wool by the capillary attraction of said fibers, substantially as described.

9. The method, substantially as described, of treating raw or greased wool by a simple continuous chemico-physical process, by introducing preheated acid gas under diminished pressures to the center of the mass, to reach intimately all fibers of the wool mass and dispersing it outward toward, and out at, the periphery of the said mass; then removing said gas, and introducing pure cold water to the center of the said mass of wool and dispersing it outward and out at the periphery of the said mass; and by introducing a preheated weak alkaline solution to the center of the mass of wool and outward in all directions through the mass of wool fibers, under diminished pressure; then extracting all of the solution, and of the moisture, from the wool mass and, immediately thereafter, introducing, under diminished pressure, a non-inflammable solvent of fat to the center of the said mass, and dispersing it outward in all directions and out of the said mass into the treating vessel and revolving the said mass in and out of the solvent to remove the sebaceous and adipose tissue fats; then drawing off from the vessel this solution and extracting all the solvent from the wool mass, first, by centrifuge, then by introducing to the center of the said mass of wool, under diminished pressure, preheated carbon dioxid gas, and, thereafter, washing the said mass with a preheated detergent solution, and rinsing it with cold water, and finally drying it, by centrifuge and by introducing under diminished pressure, and to the center of the said mass, a preheated media as compressed air thereby removing all moisture and vapors.

10. The method of treating wool fiber, which consists in rendering soluble the emulsifiable and insoluble substances deposited on the said fiber, so that they will become soluble in the subsequently used solvents then removing the extraneous and deleterious substances from said fiber by continuous process, under diminished pressures by introducing the following agents, in the order described, to the center of the mass of wool fibers and dispersing each outward to, and out at, the periphery, into the treating vessel and removing each such agent from the fiber mass and the vessel, before introducing the next in succession; beginning with a preheated gas as carbon dioxid; then with cold distilled water; with a preheated weak alkaline solution; with a preheated non-inflammable fat solvent; with carbonic acid gas, preheated; with preheated distilled water; with cold water; then drying, first by centrifuge, then with preheated compressed air.

11. The method of treating animal fibers and fabrics which consists in subjecting a mass of such material to a continuous process and introducing treating agents under diminished pressures to the center of the said mass and dispersing each outward to, and out at, the periphery of said mass into the treating vessel and in extracting each treating agent from the said mass, by centrifuge and by introducing to the center of the said mass a preheated drying medium, before introducing the next in succession; and in recovering the treating agents for reuse substantially as described.

12. The method of treating raw wool containing paint, tar, pitch, or hardened lumps of clay or excrementitious matter which consists in subjecting the said mass of material to a continuous process and introducing treating agents under diminished pressures to the center of the said mass and dispersing each outward to, and out at, the periphery into the treating vessel and removing each treating agent before introducing the next in succession from the said mass and the said vessel; beginning said treatment with a preheated gas as carbon dioxid; then with cold distilled water; then with a preheated weak alkaline solution; then with a preheated fat solvent; then treating said mass by centrifuge to remove the bulk of said solvent; then by removing the said mass from the treating machine and subjecting it to a crushing process to crush the lumps of extraneous matter; then subjecting the said mass to treatment to disintegrate the paint, thereafter re-introducing said mass to the first treating vessel and continuing the treatment by introducing preheated carbonic acid gas; then with a preheated detergent solution then rinsing with cold water, then drying substantially as described.

13. The method of treating raw wool containing burs, vegetable matter or the like substances which consists in subjecting the said mass of material to a continuous process and introducing treating agents under diminished pressures to the center of the said mass and dispersing each outward to, and out at, the periphery into the treating vessel and removing each treating agent before introducing the next in succession from the said mass and the said vessel; beginning said treatment with a preheated gas as carbon dioxid; then with cold distilled water; then with a preheated weak alkaline solution, then with a preheated fat solvent; then treating said mass by centrifuge to remove the bulk of said solvent; then by removing the said mass from the treating machine and removing the said vegetable matter, then re-introducing the said mass to the first treating vessel and subjecting it to treatment with preheated carbonic acid gas; then to a preheated detergent solution then rinsing with cold water then drying by centrifuge and a preheated compressed air substantially as described.

14. The method of treating raw wool fiber which consists in disintegrating the emulsifiable and insoluble substances deposited on the said fiber, so that they will become soluble in the subsequently used solvents, then removing the extraneous and deleterious substances from said fiber by a continuous process, under diminished pressures, by introducing the following agents in the order described, to the center of the mass of wool fibers and dispersing each outward to and out at the periphery of the said mass into the treating vessel and removing each of said agents from the fiber mass and the vessel before introducing the next in succession; beginning first with a preheated gas; then with cold water; then with a preheated weak alkaline solution.

15. The method of treating raw wool fiber which consists in disintegrating the emulsifiable and insoluble substances deposited on the said fibers, so that they will become soluble in the subsequently used solvents; then removing the extraneous and deleterious substances from said fiber by a continuous process, under diminished pressures, by introducing the following agents in the order described to the center of the mass of wool fibers and dispersing each outward to and out at the periphery of the said mass into the treating vessel and removing the said agents from the fiber mass and the vessel before introducing the next in succession; beginning with a preheated gas; then with cold water; then with a preheated weak alkaline solution; then with a preheated solvent of fats.

16. The steps in the process of treating wool which consist in rendering soluble by preheated acid gas the emulsifiable and insoluble ingredients inherent in the fibers in the raw state, then removing that portion of the suint ingredients soluble in cold water, and then removing the remaining suint ingredients by preheated weak alkaline solution, leaving the adipose tissue and sebaceous fats on the wool.

17. The herein described process of treating wool which consists in rendering soluble by preheated acid gas the emulsifiable and insoluble ingredients inherent in the fibers in the raw state, then removing that portion of the suint ingredients soluble in cold water, then removing the remaining suint ingredients by preheated weak alkaline solution, leaving the adipose tissue and sebaceous fats on the wool, and finally by fat solvent treatment removing the adipose tissue fat and the remaining sebaceous substances, constituting true wool fat.

18. As an improved article of commerce, wool consisting solely of keratin and the inherent essential oil of the wool.

19. As a new article of manufacture, animal fiber containing the essential oil and cleansed of all suint and sebaceous substances.

20. As a new article of manufacture, the herein described wool containing its essential oil in the cells of the fiber structure and having the external layer of the fiber cleansed of all deleterious suint and sebaceous ingredients.

21. As a new article of manufacture, animal fiber consisting solely of keratin and its essential oil within the fiber and deprived of all deleterious substances, the scaly and external portion of the fiber being freed of all deleterious substances, the said fiber possessing elasticity, tensile strength, luster or brightness, and susceptibility to dye-stuffs.

HERBERT P. JEFFERSON.

Witnesses:
    FRANK H. ALLEN,
    HARLOW I. FERGUSON.